United States Patent [19]
Coutellier et al.

[11] Patent Number: 5,251,088
[45] Date of Patent: Oct. 5, 1993

[54] MAGNETIC READ HEAD WITH MAGNETO-RESISTANCE EFFECT

[75] Inventors: Jean-Marc Coutellier, Maurepas; Thierry Valet, Viroflay; François X. Pirot, Les Ulis, all of France

[73] Assignee: Thomson-CSF, Puteaux, France

[21] Appl. No.: 732,797

[22] Filed: Jul. 19, 1991

[30] Foreign Application Priority Data

Jul. 20, 1990 [FR] France .................. 9009301

[51] Int. Cl.$^5$ .................................. G11B 5/127
[52] U.S. Cl. ................................................ 360/113
[58] Field of Search ................ 360/113; 324/252; 338/32 R

[56] References Cited

U.S. PATENT DOCUMENTS

4,626,946 12/1986 Vinal ................................. 360/113

FOREIGN PATENT DOCUMENTS

2090196 1/1972 France .
56-143513 11/1981 Japan .
61-153897 7/1986 Japan .
62-134814 6/1987 Japan .
258701 2/1990 Japan .

OTHER PUBLICATIONS

J. C. Slonczewski, IBM Tech. Disclosure Bulletin, "Magnetic-Field Tunnel-Sensor", vol. 19, No. 6, Nov. 1976.

Primary Examiner—Craig E. Church
Attorney, Agent, or Firm—Oblon, Spivak, McClelland, Maier & Neustadt

[57] ABSTRACT

Magnetic read heads with magneto-resistance effect of the multilayer type, are provided in a new arrangement making it possible in particular to facilitate a collective arrangement of these heads. Each read head comprises a magneto-resistance element formed by a sensitive magnetic layer superposed on a stable magnetic layer. Each read head comprises a magnetic circuit in a ring opened by an air gap, the sensitive magnetic layer being inserted in the magnetic circuit in a ring, the stable magnetic layer being outside the ring of the magnetic circuit. The arrangement of the magnetic read heads is particularly adapted for reading high density magnetic storage media.

10 Claims, 2 Drawing Sheets

MAGNETIC READ HEAD WITH MAGNETO-RESISTANCE EFFECT

BACKGROUND OF THE INVENTION

Field of the Invention

The present invention generally relates to magnetic read heads formed by multilayer magneto-resistance elements which utilize a magneto-resistance effect and more particularly, to an arrangement for simplifying the structure of such multilayer magneto-resistance elements.

In rotating magnetic heads, such as those still commonly used in particular in video recorders to constitute read/write heads, the speed of rotation of the magnetic read heads is high and it is combined with the movement of the magnetic tape. As a result of the high relative speed between the tape and head, it is possible to extract a sufficient signal with a purely inductive read head. In such an inductive read head, the magnetic field coming from a track of a magnetic tape to be read is channeled by a magnetic circuit and produces a current in a solenoid joined to the magnetic circuit.

However, such rotating magnetic head arrangements suffer certain drawbacks, in particular in regard to the weight and the bulkiness of the mechanical parts which rotate at a relatively high speed and also relative to the reliability of operation.

An alternative to such rotating head arrangements consists in recording and in re-reading the tracks of the magnetic tape with devices which are stationary relative to the magnetic tape, for example, with a single device comprising one or more magnetic heads which operate either by writing, i.e., by recording, or by reading, or else with two devices, one of which is for writing and other for reading.

However, the movement of the magnetic tape is slow and if the magnetic heads are stationary relative to the tape, the variations of the magnetic field occur at relatively low speed (typically several centimeters per second), and it is impossible under these conditions to extract a sufficient signal using a purely inductive head.

As an alternative, magnetic read heads which use the magneto-resistance effect can be stationary in front of the magnetic tape, while delivering a sufficient useful signal.

In fact, sensors employing the magneto-resistance effect are currently used in various magnetic track reading devices. These sensors are placed in the vicinity of a mobile magnetic track, and their variations of electrical resistance are detected in response to the variations of the magnetic field recorded on the magnetic track of the tape.

Of the alloys commonly used to constitute a magneto-resistance element or sensor, in particular ferromagnetic alloys, such as, for example, permalloy ($Fe_{80} Ni_{20}$), can be cited.

It should be noted that magneto-resistance elements can be separated into two types: 1) the mono-layer type in which the resistivity depends only on the relative orientation of the magnetization and the current in the material, and 2) the multilayer type in which the magneto-resistance effect is linked to a diffusion of the carriers dependent on their spin state.

The multilayer structure typically comprises a stack of at least two magnetic layers separated by a nonmagnetic layer, the two magnetic layers having an anti-ferromagnetic type coupling. One of the magnetic layers, hereinafter referred to as the "sensitive magnetic layer", has a coercive field which is considerably weaker than that of the other magnetic layer. The other magnetic layer which has the stronger coercive field is hereinafter referred to as the "stable magnetic layer". The sensitive magnetic layer is subjected to the influence of the magnetic field of the magnetic track, so that its magnetic orientation fluctuates. As a result, the magnetizations of the two magnetic layers go from an anti-parallel arrangement state to a parallel arrangement state, a variation of the resistivity of the two magnetic layers occurring at the transition between these two states.

It is possible to find detailed explanations on the magneto-resistance effect and the structure of magneto-resistance elements of the multilayer type in "Theory of giant magneto-resistance effects in magnetic layered structures with anti-ferromagnetic coupling," R. E. CAMLEY et al., Phys. Rev. Lett., V. 63 (6), page 664, 1989.

It should be noted that the magneto-resistance elements of the multilayer type have a greater structural complexity than the mono-layer type elements, but they offer the advantage of providing a more significant useful signal. Actually, the useful signal, i.e., the variation of the current which flows in the magnetic layers, is linked to the ratio of the variation of resistance $\Delta 3 R$ to resistance R between these two layers. This ratio is typically on the order of 10% in the case of the magneto-resistance elements of the multilayer type, while it is only on the order of 3% in the case of the monolayer type.

SUMMARY OF THE INVENTION

One object of the present invention is to simplify the structure of magnetic read heads incorporating magneto-resistance elements of the multilayer type to facilitate a collective arrangement of such heads, both for a unit use and to combine a large number of read heads in the same magnetic device, for example, to read concurrently a large number of magnetic tracks.

According to preferred embodiments of the present invention these and other objects, advantages and features are achieved by a magnetic reading device comprising a substrate on which is produced at least one magnetic read head subjected to the influence of a magnetic track. The read head is a magneto-resistance element of the multilayer type comprising a stack formed by at least a first and a second magnet layer respectively forming a stable magnetic layer and a sensitive magnetic layer. The two magnetic layers are separated by a nonmagnetic layer, a current being established between these two magnetic layers by applying a control voltage to them.

The magnetic reading device is characterized in that the read head comprises a magnetic circuit formed in a ring like configuration in which the sensitive magnetic layer is inserted, the ring like magnetic circuit being opened by an air gap located close to a passage plane of the magnetic track, wherein the stable magnetic layer is located outside the ring of the magnetic circuit.

BRIEF DESCRIPTION OF THE DRAWINGS

The invention will be understood better from reading the following description, given by way of nonlimiting example with reference to the three accompanying figures of which.

DETAILED DESCRIPTION OF THE PREFERRED EMBODIMENTS

Figure 1:
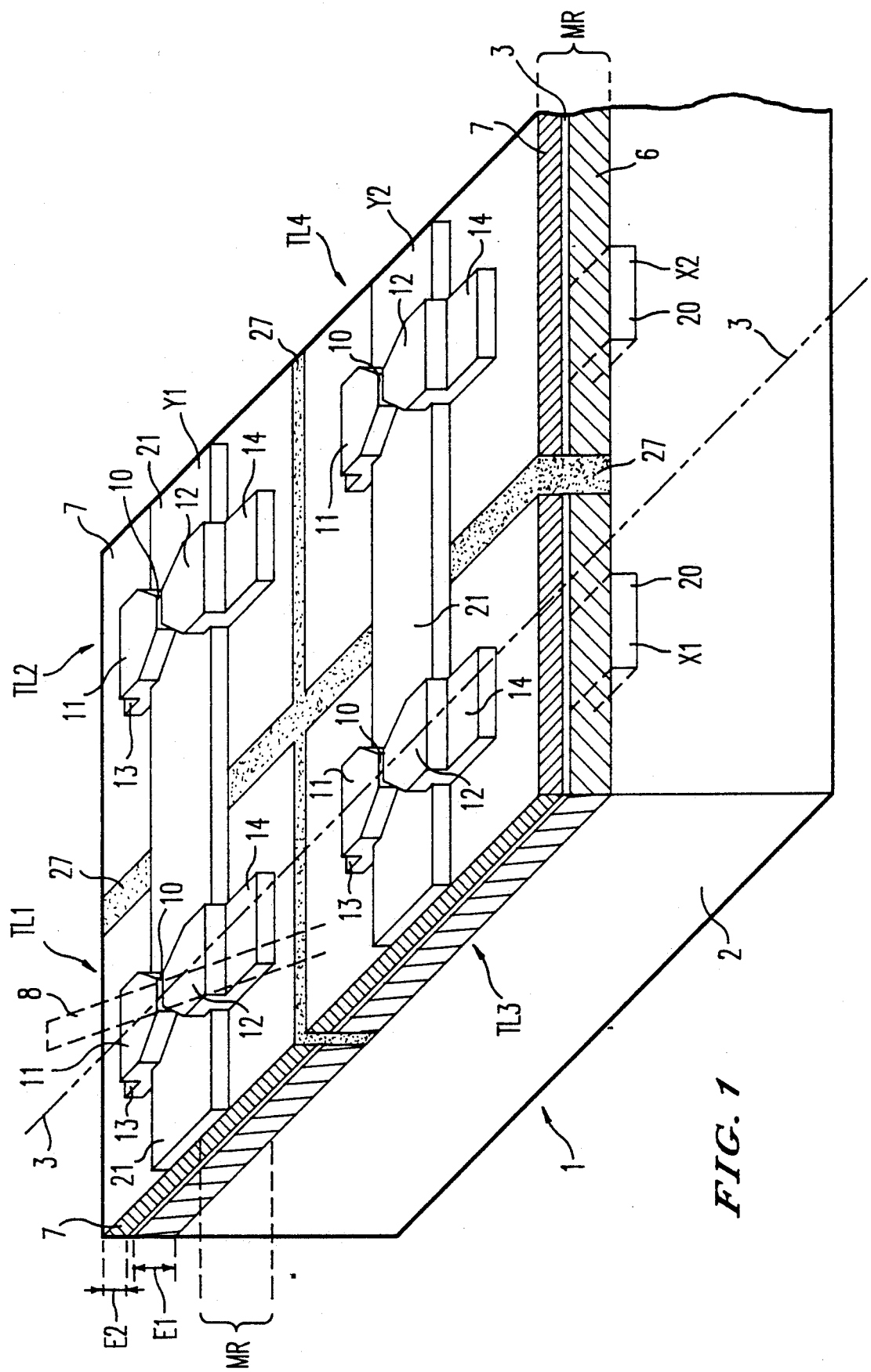
FIG. 1 is a perspective view diagrammatically illustrating a magnetic reading device according to one embodiment of the present invention.

FIG. 1 shows a magnetic reading device 1 comprising several magnetic read heads TL1, TL2, TL3, TL4 produced on same substrate 2. In the nonlimiting example described, four read heads TL1 to TL4 are represented to illustrate the fact that the structure of these read heads lends itself particularly well to a collective arrangement of read heads on the same substrate, either to separate them then subsequently by cutting to make individual heads, or to make a magnetic device comprising multiple read heads. However, device 1 can comprise a smaller number of these read heads, or a much larger number.

Each read head comprises a magneto-resistance element MR of the multilayer type. In the nonlimiting example described, each magneto-resistance element MR comprises, in a way standard in the art, two superposed magnetic layers 6, 7, one of which is a stable magnetic layer and the other is a sensitive magnetic layer. These two magnetic layers 6, 7 are separated by a nonmagnetic layer 3.

The first magnetic layer 6, closest to substrate 2, is the stable magnetic layer and has a stable magnetization direction, i.e., its coercive field is considerably greater than that of the second magnetic layer 7. The second magnetic layer 7 is the sensitive magnetic layer 7 whose magnetization direction can fluctuate under the influence of an outside magnetic field.

The two magnetic layers 6, 7 and nonmagnetic layer 3 are produced in a standard way so that the two magnetic layers 6, 7 have an anti-ferromagnetic coupling.

The stable magnetic layer 6 and the sensitive magnetic layer 7 can respectively consist of, for example, a ferromagnetic alloy such as, for example, nickel-cobalt $Ni_x Co_y$ for the stable magnetic layer 6, and permalloy $Fe_{80} Ni_{20}$ for the sensitive magnetic layer 7. The nonmagnetic layer 3 can be made, for example, of silver or copper.

Alternatively, the two ferromagnetic layers 6, 7 can both be of the same material, iron, for example, but with different thicknesses E1, E2, several times greater for thickness E1 of the stable magnetic layer 6 than for thickness E2 of the sensitive layer 7. For example, E1 can be on the order of 1 micron and E2 can be on the order of 0.01 micron, the thickness of the nonmagnetic layer being, for example, 0.001 micron.

The sensitive layer 7 is subjected to the influence of a magnetic field recorded on a magnetic track 8 (for greater clarity of the figure, a single magnetic track 8 is represented in dotted lines). For this purpose, according to the invention, this magnetic field is brought up to magneto-resistance element MR with a magnetic circuit of the ring type, comprising an air gap 10, air gap 10 being made in the immediate vicinity of the passage plane of magnetic track 8.

This arrangement offers the advantage of being able to place layers 6, 7, 3 of magneto-resistance element MR in planes parallel to the plane of the substrate 2 and to the passage plane of track 8. As a result, it is possible to use a large number of read heads located very close to one another to read a large number of tracks simultaneously. Additionally, such an arrangement provides a general arrangement which favors the production of these read heads collectively, in particular by using the technology of thin layers, even if, optionally, these heads are to be later separated from one another after their collective formation, to constitute individual heads.

The magnetic circuit comprises two magnetic poles 11, 12 placed on both sides of the air gap 10 as shown in FIG. 1. These two magnetic poles 11, 12 are each extended by a magnetic part 13, 14 which is in contact with the sensitive magnetic layer 7.

Actually, the magnetic circuit comprises the two magnetic poles 11, 12, the two magnetic parts 13, 14 and the sensitive magnetic layer 7, which is inserted between these two magnetic parts 13, 14.

The two magnetic poles 11, 12 are contained in a plane which is very close to the passage plane of track 8. The two magnetic parts 13, 14 are located in a plane which is farther from track 8 than magnetic poles 11, 12. Additionally, the sensitive magnetic layer 7 is located in a plane which is still farther from track 8.

The latter combination of elements (poles 11, 12, parts 13, 14 and layer 7) embodies the ring structure of the magnetic circuit, the plane of the ring being perpendicular to the plane of substrate 2 and layers 6, 3, 7; and stable magnetic layer 6 being outside the ring, between the latter and substrate 2.

Such a ring structure lends itself particularly well to achieving the power supply connections of the stable magnetic layers and sensitive magnetic layers 7 by conductors located in different planes.

For this purpose, according to a characteristic of the invention, for each magnetic head T11 to TL4, a first electric conductor 20 is provided between substrate 2 and stable magnetic layer 6, with which this first conductor 20 is in contact. Additionally, a second electric conductor 21 is provided between magnetic heads 11, 12 and sensitive magnetic layer 7 with which this second conductor 21 is in contact. Second conductor 21 is made approximately in the same plane as that of magnetic parts 13, 14, so that it can go into the ring of the magnetic circuit, as defined above, and extend in a direction approximately perpendicular to that of first conductor 20.

Thus, the magnetic reading device can include plurality of first conductors 20 constituting a network of column conductors X1, X2, and a plurality of second conductors 21 constituting a network of line conductors Y1, Y2, intersecting with the column conductors. Each read head T11 to TL4 is placed approximately at an intersection of a column conductor X1, X2 with a line conductor Y1, Y2, and its power supply is achieved with column conductor X1, X2 and with line conductor Y1, Y2, which form the corresponding intersection.

It is necessary to note that the name "line" or "column" given to the conductors as used herein is arbitrary and does not convey their orientation, and that the columns are not necessarily perpendicular to the lines.

Thus, magnetic heads T11 to TL4 are placed in lines and columns to which a line conductor Y1, Y2, and a column conductor X1, X2 correspond; each line conductor Y1, Y2 being in contact with all sensitive magnetic layers 7 of the same line, and each column conductor X1, X2 being in contact with all stable magnetic layers 6 of the same column.

The structure shown in FIG. 1 can be produced, as will be discussed below, in various ways all known to the skilled artisan, in particular by the thin-layer or so called thin-film technique. This technique is now well known and is not required to be illustrated.

Substrate 2 is made of a nonmagnetic material, for example, glass or insulating silicon. A layer of a conductive material, for example, copper, of which column conductors X1, X2 are made by engraving, is deposited on substrate 2. These conductors can also be integrated in substrate 2, as in the example of FIG. 1, by making, in a way standard in the art, grooves which are then filled by the conductive material.

Then, for example, an entire magnetic layer, intended to form stable magnetic layers 6, is applied. Thereafter, a nonmagnetic layer intended to form nonmagnetic layers 3 is deposited. Then, a magnetic layer intended to form sensitive magnetic layers 7 is deposited on the unit. Then, the three layers 7, 6, 3 are engraved in the form of dividers each constituting a magneto-resistance element MR. Thereafter, an insulating layer 27 is deposited to separate the dividers, then a layer of a conductive material which is engraved to constitute line conductors Y1, Y2, i.e., second conductors 21.

Then, magnetic poles 11, 12, separated by the air gap 10, are made, for example, by depositing successively several layers of "Sendust" according to a known technique, as described, for example, in a French patent application 86 14974, assigned to THOMSON-CSF.

In a way standard in the art, the measuring signal corresponding to the magnetic field recorded on track 8 consists of a variation of a measuring current which flows between stable magnetic layer 6 and sensitive magnetic layer 7 when a control voltage is applied between these two layers 6, 7. In the configuration of FIG. 1, the control voltage is applied with a column conductor X1, X2 and a line conductor Y1, Y2, and the current flows perpendicularly to the plane of magnetic layers 6, 7 in and between these two conductors.

The read head structure shown in FIG. 1 has been described with reference to a head in which a magneto-resistance effect is used with a multilayer magnetic structure MR, this multilayer magnetic structure being of the type comprising a stable magnetic layer 6 and a sensitive magnetic layer 7 separated by a nonmagnetic layer 3. The action of the magnetic field recorded on a magnetic reading track causes a fluctuation of the magnetic orientation of the sensitive layer, a fluctuation which gives rise to a variation of an electric current which flows in the two magnetic layers.

The nonmagnetic layer 3 is preferably electrically conductive in the above described embodiment of the present invention and it allows the passage of the current between the two magnetic layers 6, 7. The phenomenon used is in this case purely magneto-resistant.

It is known (see, for example, the article of S. MAEKAWA and U. GAFVERT published in I.E.E.E. TRANSACTION ON MAGNETICS, Vol. MAG-18, No. 2, March 1982) that such a variation of a current can also be obtained by using a "tunnel" effect in a structure and under conditions similar to those relative to the purely magneto-resistant effect and which comply with the same rules concerning in particular the anti-ferromagnetic coupling of stable magnetic layer 6 and sensitive magnetic layer 7.

In the case of the "tunnel" effect, nonmagnetic layer 3 is an insulating or semiconducting layer, for example, of silicon, with a thickness on the order of 0.01 micron; magnetic layers 6, 7 being of the same nature as in the preceding case. By applying a voltage between two magnetic layers 6 and 7, it is possible to observe a current which by the "tunnel" effect flows between magnetic layers 6, 7. The fluctuation of the magnetic orientation of sensitive layer 7 causes a modification of the amplitude of this "tunnel" current in a manner similar to the variation of amplitude of the current in the purely magneto-resistant case described previously.

Thus, taking into account these similarities of structure and effects, the term "magneto-resistance element of the multilayer type" as used herein defines both a structure using the purely magneto-resistant effect and a structure using the "tunnel" effect.

Figure 2:
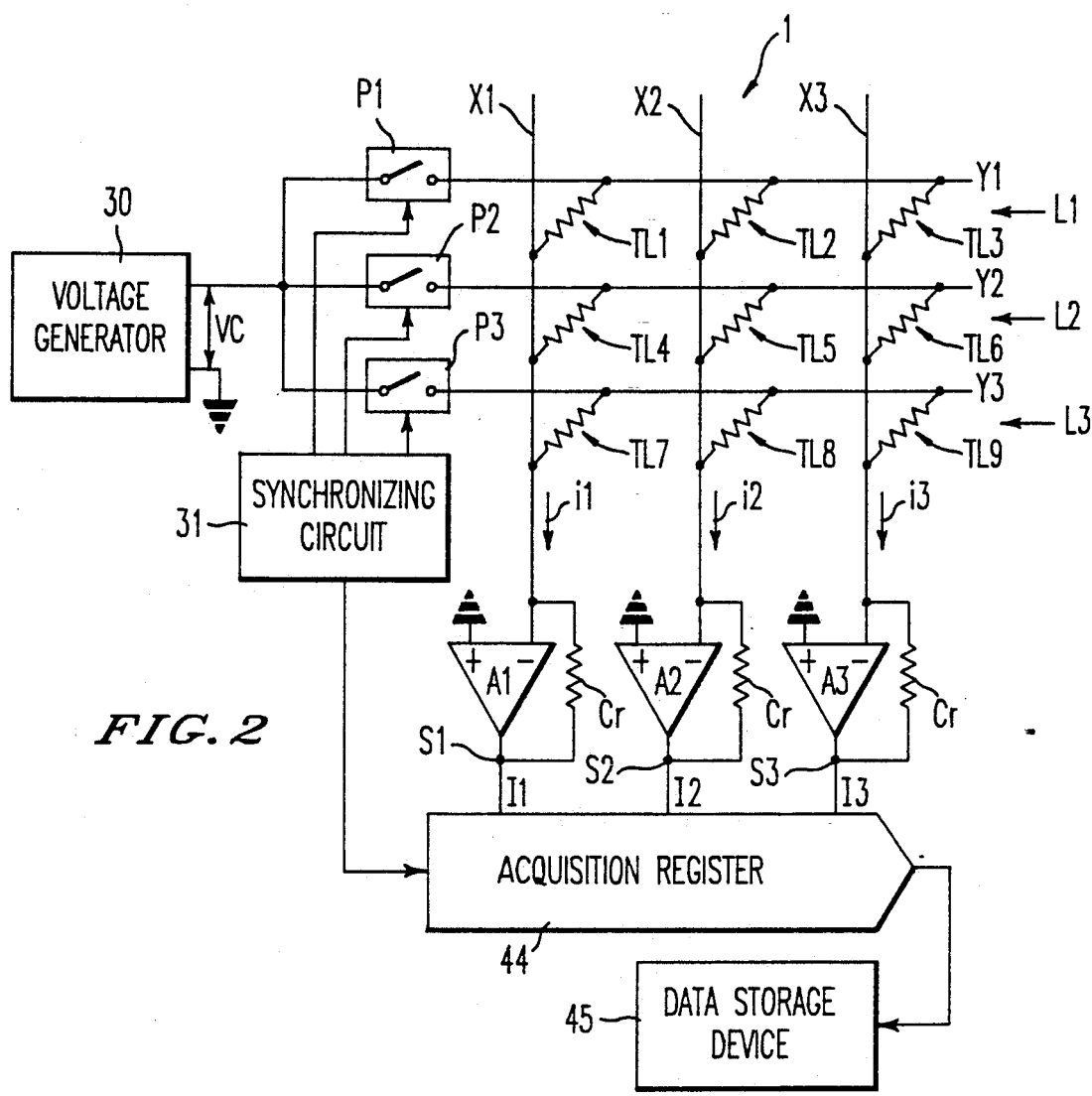
FIG. 2 is an electrical diagram which illustrates an arrangement for addressing selected read heads.

FIG. 2 diagrammatically shows, by way of nonlimiting example, a reading device according to the invention in which multiple read heads, similar to read heads TL1 to TL4 shown in FIG. 1, are selected by a matrix type addressing arrangement.

To simplify the description, reading device 1 shown in FIG. 2 comprises only three line conductors Y1, Y2, Y3 intersected with three column conductors X1, X2, X3, giving rise to nine intersections each comprising a read head TL1 to TL9. However, in practice, the number of conductors and lines and columns can be much larger.

Read heads TL1 to TL9 being of the multilayer magneto-resistance type, are represented in the form of resistors. For each read head, one end of the representative resistor, consisting, for example, of sensitive magnetic layer 7, is connected to line conductor Y1 to Y3 of its intersection; and the other end of the resistor, i.e., stable magnetic layer 6, is connected to column electrode X1 to X3 of the same intersection. Thus, for example, a first line L1 of the read head comprises heads TL1, TL2, TL3, whose stable magnetic layers 6 are each connected respectively to first, second and third column conductors Xi, X2 and X3; while stable magnetic layers 7 are connected to first line conductor Y1. The read heads of lines L2 and L3 are connected in a similar way to the line and column conductors of their intersection.

Reading device 1 includes a voltage generator 30 producing a control voltage VC (relative to a reference potential which is the ground, for example). The control voltage VC is intended to be applied to read heads TL1 to TL9 and more precisely to the magneto-resistance elements.

Reading device 1 further comprises a gate device comprising as many gates P1 to P3 (analog, for example) as there are line conductors Y1 to Y3.

An output of each gate P1 to P3 is connected to one of the line conductors (Y1 to Y3) and the gate inputs are all connected to an output of voltage generator 30 delivering control voltage VC.

Each gate P1 to P3 is controlled by a synchronizing circuit 31, which determines the "blocking" state or the "passing" state of the gate being considered. In the "passing" state, control voltage VC is applied to a selected one of the line conductors Y1 to Y3 under a low impedance; while in the "blocking" state, the line conductor is not connected to voltage generator 30, except through a very high impedance. In other words, with the "blocking" state of a given gate P1 to P3, the corresponding line conductor is "floating," i.e., is not connected to anything.

Column conductors Xi to X3 are brought to the ground potential by a current detector A1 to A3 making it possible to detect variations representing the magneto-resistance effect.

In the nonlimiting example described, these detectors A1 to A3 are amplifiers A1 to A3 with low input impedance, standard in the art, each having a first input (−) connected to a column conductor X1 to X3, and a second input (+) connected to the ground potential to bring back this potential (at low impedance) on the column conductor. Each amplifier A1 to A3 respectively has an output S1 to S3 connected to its first input (−) by a negative feedback resistor Cr.

Each output S1 to S3 of amplifiers A1 to A3 is respectively connected to an input I1 to I3 of an acquisition register 44 of the shift register type of which each case can store an analog value, a voltage, for example. Acquisition register 44 is further connected to synchronizing circuit 31 which determines in particular the transfer of the data acquired in register 44.

The reading of the selected magnetic tracks is performed by addressing, line by line, corresponding magnetic heads TL1 to TL9. The addressing of first read head line L1 is achieved by controlling first gate P1 by synchronizing circuit 31 to put it in the "Passing" state, while gates P2 and P3, which correspond respectively to line conductors Y2 and Y3 (i.e., to read head lines L2 and L3) are kept in the "blocking" state. Under these conditions, control voltage VC (on the order, for example, of several volts) is applied (through a low impedance) only to the first three read heads TL1, TL2, TL3 connected to the first line conductor Y1. A current i1, i2, i3 then respectively flows in columns X1 to X3.

For each column conductor X1 to X3, this current is translated into voltage by amplifiers A1 to A3, and this voltage is charged in corresponding inputs I1 to I3 of acquisition register 44. The value of the nominal current being known, any difference with this value represents a signal due to the magneto-resistance effect.

First gate Pi is then controlled to be again in the "blocking" state. Then, synchronizing circuit 31 controls the transfer of data accumulated in acquisition register 44 to a data storage device 45.

Acquisition register 44 being emptied, synchronizing circuit 31 controls the second gate P2, which is connected to second line conductor Y2, so as to assume the "passing" state. The latter performs the addressing of fourth, fifth and sixth read heads TL4, TL5, TL6 belonging to second line L2. The operation is similar to that already described for line L1, i.e., the signals provided by amplifiers A1 to A3 are charged in acquisition register 44, then transferred to data storage device 45.

The same operation is repeated for third line L3 which combines seventh, eighth and ninth heads TL7, TL8, TL9.

This description of a matrix addressing mode constitutes a nonlimiting example. Other arrangements can be used while remaining within the framework of the invention, since control voltage VC is applied at low impedance to a selected read head and is not otherwise applied through a high impedance to the read heads which are not selected.

In the case particularly of a matrix addressing of read heads TL1 to TL9 using the purely magneto-resistant effect, the current delivered by each read head can be adjusted and, more precisely, reduced at the level of each of these heads, by reducing the conduction section in the multilayer magneto-resistance element, which has the effect of increasing its resistance.

Figure 3:
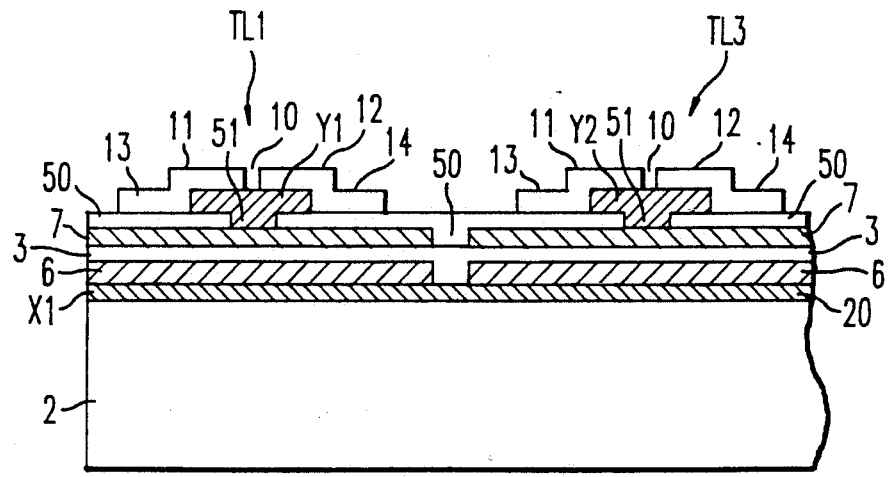
FIG. 3 is a sectional view taken along section line 3—3 of FIG. 1 which diagrammatically illustrates a further embodiment of magnetic read heads of the present invention.

FIG. 3 shows diagrammatically, by way of nonlimiting example, a way of reducing the conduction section of the multilayer magneto-resistance elements with an insulating layer 50 inserted in series with a line conductor.

It should be noted that the conduction section is already limited to an intersecting surface, formed for each read head by the surfaces opposite the column electrode intersected with the line electrode. This surface can still be too large for the conduction section; however, it is not desirable to reduce the dimensions of the line and column conductors so as not to increase the electrical resistance that they exhibit, particularly when a large number of read heads is connected to them.

The solution shown in FIG. 3 comprises inserting the insulating layer 50 as indicated above and making in this layer 50 an opening or window 51 having approximately the section that it is desired to impart to the conduction section.

FIG. 3 is a view in section of the structure of FIG. 1, along an axis 3—3 shown in FIG. 1, a view which makes it possible to represent window 51 at the level of read heads TL1, TL3.

In the same way as in the example of FIG. 1, for each read head, substrate 2 carries conductor 20 or column conductor X1, on which are formed successively: 1) stable magnetic layers 6; 2) conductive nonmagnetic layers 3; and 3) sensitive magnetic layers 7.

Then, there is provided insulating layer 50 which constitutes a mask between each sensitive magnetic layer 7 and conductor 21 or corresponding line conductor Y1, Y2. Insulating layer 50 has a thickness on the order of, for example, 0.1 micron. The action of such an insulating layer 50 is insignificant on the magnetic field in the magnetic circuit, so that magnetic parts 13, 14 and magnetic poles 11, 12 can be produced on this insulating layer 50.

Window 51, having been produced before line conductor Y1, Y2, the conductive material of which the latter consists fills window 51 and assures the electrical contact between sensitive magnetic layer 7 and line conductor Y1, Y2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secure by Letters Patent of the United States is:

1. A magnetic reading device comprising:
   a substrate having at least one magnetic read head to be subjected to the influence of a magnetic track;
   a multilayer magneto-resistance element, forming the at least one magnetic read head, comprising a stack formed by at least a first and a second magnetic layer respectively forming a stable magnetic layer having a first coercive field and a sensitive magnetic layer having a second coercive field with a value less than said first coercive field, the first and second magnetic layers being separated by a nonmagnetic layer; and
   conductor means for establishing a current between the first and second magnetic layers by applying a control voltage to said first and second magnet layers;

wherein the read head comprises a magnetic circuit having a ring like configuration in which the sensitive magnetic layer is inserted, the magnetic circuit being opened by an air gap located close to a passage plane of magnetic track, with a plane of the ring being perpendicular to a plane of substrate, and wherein the stable magnetic layer is located outside the ring of the magnetic circuit.

2. A magnetic device according to claim 1, wherein the stable and sensitive magnetic layers are respectively in planes parallel to a plane of the substrate and to the passage plane of track.

3. A magnetic device according to claim 1, wherein the conductor means comprises by a line conductor connected to sensitive magnetic layer and a column conductor connected to stable magnetic layer, the column conductor being located between substrate and stable magnetic layer and line conductor passing in the ring of the magnetic circuit.

4. A magnetic device according to claim 1, wherein the stable magnetic layer has a thickness considerably larger than a thickness of sensitive magnetic layer.

5. A magnetic device according to claim 1, wherein the nonmagnetic layer is electrically conductive.

6. A magnetic device according to claim 5, wherein an electrically insulating layer is inserted between sensitive magnetic layer and line conductor, and wherein sensitive magnetic layer and the line conductor are in contact electrically by an opening formed in the electrically insulating layer.

7. A magnetic device according to claim 1, wherein nonmagnetic layer is electrically insulating.

8. A magnetic device according claim 1, further comprising, on the substrate, a plurality of read heads forming a matrix network, wherein the conductor means comprises a network of line conductors and a network of column conductors intersected with the line conductors, each line conductor being connected to sensitive magnetic layers of a corresponding read head line and each column conductor being connected to stable magnetic layers of a corresponding read head column.

9. A magnetic device according to claim 8, wherein each column conductor is connected to a potential of the control voltage by a current detector and wherein each line conductor is connected to the second potential of the control voltage by a gate having one of a low impedance and a high impedance.

10. A device according to claim 9, further comprising control means for controlling each of the gates to select a given one of the read head lines.

* * * * *